United States Patent [19]

Buck, Jr.

[11] E Re. 30,969

Best Available Copy [45] Reissued Jun. 15, 1982

[54] DEVICE FOR OPENING, CLOSING AND LATCHING A VENT CLOSURE MEMBER

[75] Inventor: Elwood W. Buck, Jr., Pasadena, Calif.

[73] Assignee: D G Shelter Products Company, City of Industry, Calif.

[21] Appl. No.: 113,716

[22] Filed: Jan. 21, 1980

Related U.S. Patent Documents

Reissue of:

[64] Patent No.: 4,120,524
Issued: Oct. 17, 1978
Appl. No.: 813,502
Filed: Jul. 7, 1977

[51] Int. Cl.[3] ..... E05C 17/32

[52] U.S. Cl. ..... 292/263; 292/DIG. 49

[58] Field of Search ..... 292/92, 263, 341.18, 292/341.19, DIG. 39, DIG. 49

[56] References Cited

U.S. PATENT DOCUMENTS

| | | | |
|---|---|---|---|
| 1,746,556 | 2/1930 | Preston | 292/263 X |
| 1,875,453 | 9/1932 | Haskins | 292/DIG. 39 |
| 2,475,131 | 7/1949 | Edwards et al. | 292/263 |
| 2,555,329 | 6/1951 | Foster | 292/263 |
| 2,941,834 | 6/1960 | Appleton et al. | 292/341.19 |
| 3,974,753 | 8/1976 | Blomgren et al. | 292/263 X |
| 4,005,901 | 2/1977 | Lutke et al. | 296/137 B |

FOREIGN PATENT DOCUMENTS

| | | | |
|---|---|---|---|
| 533581 | 12/1954 | Belgium | 292/DIG. 49 |

*Primary Examiner*—Richard E. Moore
*Attorney, Agent, or Firm*—Poms, Smith, Lande & Glenny

[57] ABSTRACT

A device for opening, closing and latching a roof vent closure member for vehicles and including an upper latch member pivotally connected to the closure member, a lower latch member pivotally connected to the frame defining the opening in the roof, said upper and lower latch members being pivotally interconnected and a bar connected to said upper latch member in offset relation to its pivotal connection to the lower latch member for actuating the device. The pivotal connections of the latch members are arranged to provide a toggle or off center relationship in closed position of the closure member. The latch members and pivotal connections thereof are so arranged to permit the crossbar to be positioned below and outwardly of the frame defining the roof opening to provide headroom, non-obstructed vision, and aesthetic appearance. The device includes means for adjusting the positions of certain pivotal axes of said pivotal interconnections to adjust the latch members to roof or wall structures of different depth.

12 Claims, 15 Drawing Figures

DEVICE FOR OPENING, CLOSING AND LATCHING A VENT CLOSURE MEMBER

Matter enclosed in heavy brackets [ ] appears in the original patent but forms no part of this reissue specification; matter printed in italics indicates the additions made by reissue.

BACKGROUND OF THE INVENTION

Vehicles having metal roofs and side walls often include openings with vent panels for purposes of ventilation, light, and sometimes as an escape path. It is desirable that such vent panels be readily and conveniently operable by one hand, preferably in a simplified single motion; that the operating means for raising and lowering the vent panel not obstruct the view through the opening in vent closed position or along the vehicle; and that the operating means be as much out of the way as possible and not project into the interior space of the vehicle to constitute a hazard. While the operating means is preferably out of the way yet the operating means must be readily grasped and moved. It is also desired that the operating means be positive in operation and that the construction be such that the roof vent panel will be tightly sealed and will not vibrate. It is desirable that lightweight materials be used and that distortion of such lightweight materials be restricted. Since walls of different vehicles are constructed of different thickness, it is desirable that the operator means be adjustable so that a suitable close fit of the operator means may be made with respect to the wall. In addition, the operator means should be readily adapted to vent panels of different width and to framed or unframed transparent panels such as plexiglass.

Such general requirements of a means for operating or opening, closing, and latching a closure member for a framed opening in a roof is contemplated by the present invention as well as other features herein described.

Prior proposed devices for opening and closing vent panels have usually required two hands or two operations to release and lift the panel or the use of one hand to successively release, operate, or latch a vent panel. One prior proposed construction is disclosed in Green U.S. Pat. No. 1,860,245 in which a side vent window is moved to open and closed position by a handle located at the pivotal interconnection of adjacent ends of a link connected to the window and a link connected to the frame. In Binert U.S. Pat. No. 2,949,624, a lifting linkage for an upwardly pivotable vent panel in the roof structure of a vehicle is disclosed wherein the links are located along sides of the opening and are operated by a means which exerts a force parallel to the opening. The links in collapsed position lie between the bottom of the opening and the vent panel. In Belgium Pat. No. 533,581 (1954) operator means are provided for a vent panel in the roof of a vehicle wherein links are pivotally interconnected, one of the links having a pivotal connection to the vent panel and other link having a pivotal connection to the frame. The operating bar is located at the axis of the pivotally interconnected ends of said links and extends between two sets of such links to faciliate simultaneous operation.

The prior art structures mentioned did not completely meet one or more of the desirable requirements commented upon above.

SUMMARY OF THE INVENTION

The main purpose of the present invention is to provide a means for opening, closing, and latching a closure panel for an opening which will obviate disadvantages of the prior art structures and which will provide an operating means for a vent closure member having definite advantages over prior art constructions.

The primary object of the present invention therefore is to provide a means for opening and closing and latching a closure member for an opening which may be readily grasped and operated by one hand if desired.

An object of the invention is to provide an operator for a closure member wherein means are provided for adjusting the relative position of the operator means with respect to a wall structure to facilitate its operation.

Another object of the invention is to provide weather tight closing means for opening, closing, and latching a closure member for an opening in a wall wherein one of the pivotal connections may be readily adjusted to provide finger clearance to faciliate the grasping of the operator means and to hold the operator means in a non-obstructive non-hazardous position.

A still further object of the present invention is to provide means for restricting distortion of frame members used with the operator means, means for weather sealing the closure member in closed position and means for readily adapting a device of this invention to framed or unframed closures.

Various other objects and advantages of the present invention will be readily apparent from the following description of the drawings in which an exemplary embodiment of the invention is shown.

DETAILED DESCRIPTION

Figure 1:
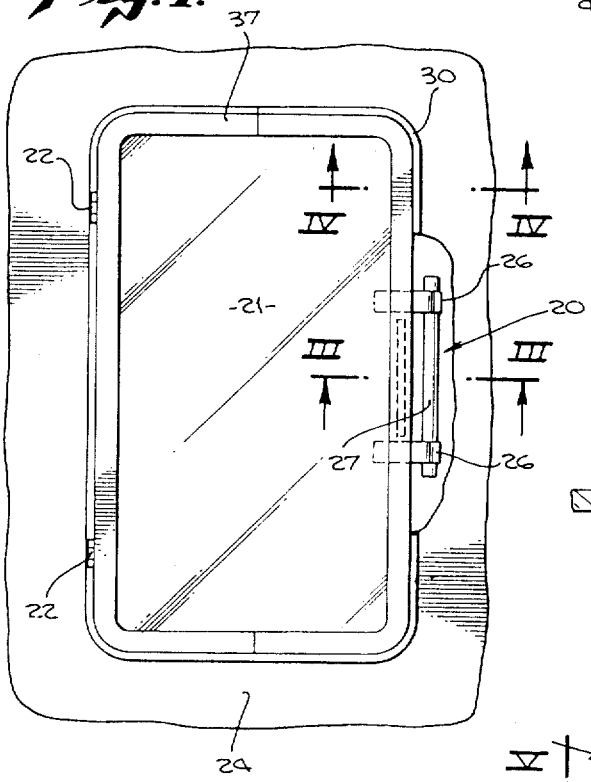
FIG. 1 is a fragmentary top plan view of a roof of a recreational vehicle equipped with a vent closure member embodying this invention.
Figure 3:
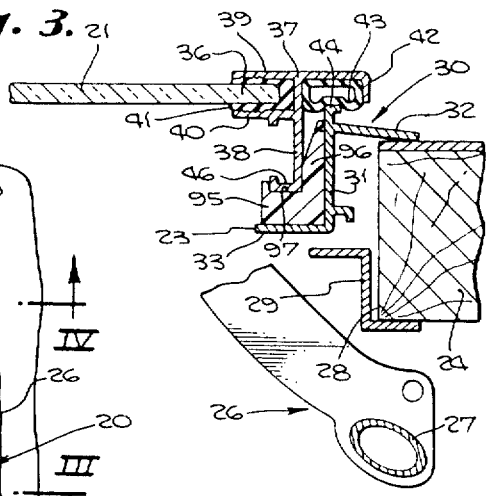
FIG. 3 is an enlarged fragmentary sectional view taken in a vertical plane indicated by line III—III of FIG. 1.
Figure 2:
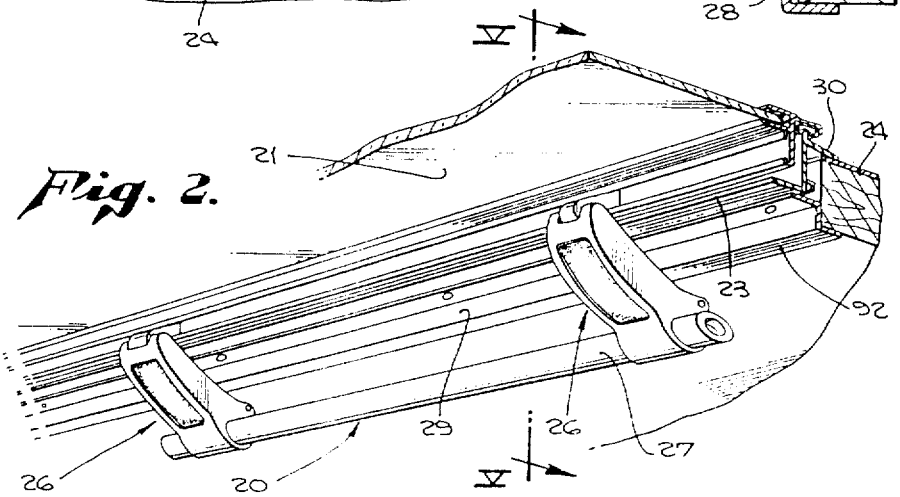
FIG. 2 is a fragmentary perspective interior view of a means for moving said closure member into open, closed and latched position and embodying this invention.
Figure 5:
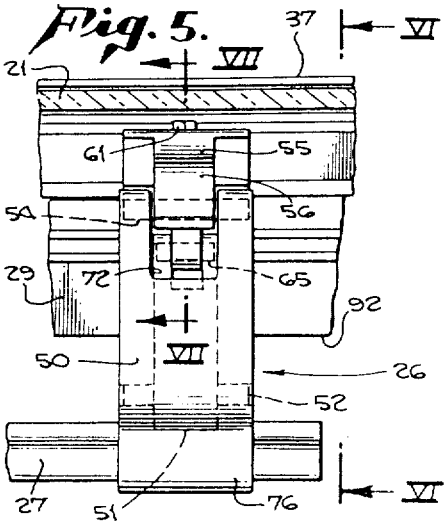
FIG. 5 is a fragmentary vertical sectional view taken in the plane indicated by V—V of FIG. 2.
Figure 8:
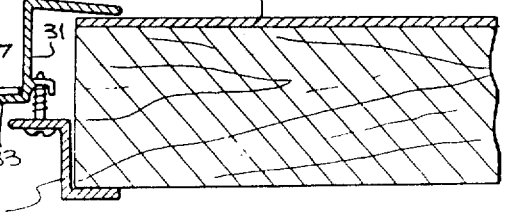
FIG. 8 is an enlarged fragmentary sectional view showing the latch members in extended position with the closure member in raised open position.

Referring first to FIGS. 1, 2, and 8, a means generally indicated at 20 for opening, closing, and latching a closure member 21 hinged at 22 at one side of an opening 23 in a roof or wall 24 is generally illustrated. The hinges 22 may be of fixed type or of readily releasable type which permit the closure member 21 to be quickly removed from its position over opening 23. The latch means 20 on the side of the opening opposite hinges 22 may comprise a pair of spaced sets or assemblies 26 of latch members interconnected for simultaneous operation by a transverse crossbar 27.

The roof or wall 24 is of any suitable construction from which a framing opening 28 of selected size is cut. The framing opening 28 in this example may be provided with a lower peripherally extending Z-sectioned member 29. Upper peripheral edges of framing opening 28 are covered by a peripheral frame member 30 of suitable cross section. In this example frame member 30 includes a vertical web 31 and outwardly extending upper inclined flange 32 which overlies the edge of framing opening 28 and a bottom inwardly extending flange 33 which provides a seat for peripheral suitable sealing material 34.

Closure member 21 may be of suitable material and in this example is illustrated as a translucent or transparent glass or plastic material. Peripheral edge portions 36 of member 21 are connected to a peripheral closure frame member 37 of suitable cross section. In this example closure frame member 37 is of generally T-section having a vertical web 38, a cross flange 39 which defines with an intermediate inwardly extending flange 40 a recess for receiving sealing material 42 which sealingly and resiliently supports the peripheral edge portions 36 of closure member 21. Cross flange 39 extends outwardly and has a downturned lip 42 which provides a channel for a hollow seal member 43 adapted to bear upon top edge of web 31 as at 44 to provide weather sealing engagement therewith. The lower portion of web 38 has a bottom lip 46 adapted to sealingly engage at 47 the seal material 34.

Means 20 to open, close, and latch the closure member 21 comprises the two sets of latch means 26 interconnected by crossbar 27, the spacing between the latch means 26 being selected to provide substantially uniform pressure of the peripheral closure frame member 37 against the seal material 43, 34 when in closed and latched position.

Each latch means 26, FIGS. 5-8, inclusive, comprises an upper latch element 50 and a lower latch element 51 having adjacent ends provided with a pivotal connection at 52. The upper end of latch element 50 has a pivotal connection at 54 to an anchor means 55 secured to closure frame member 37. In this example, anchor means 55 includes an inwardly extending slightly curved anchor body 56 provided with oppositely directed lugs 57 engageable with ribs 58 provided on frame member 37. Cooperable with anchor body 55 is a similarly curved anchor element 60 providing at one end pivotal connection 54 and positioned and secured to body 55 by a suitable nut and bolt assembly 61 extending through body 55 and engaging an elongated slot 62 in anchor element 60. Opposed surfaces of anchor body 55 and element 60 are serrated as at 63 to provide a mating interlock for fixedly positioning pivotal connection 54. Slot 62 and bolt assembly 61 provide a means for adjustment of the position of pivotal connection 54 for a purpose later described.

Lower latch member 51 has a pivotal connection 65 to a bottom anchor member 66 secured by suitable rivet means 67 to bottom flange 33 of roof frame member 30. Anchor member 66 has an inwardly directed downwardly inclined anchor portion 68 for positioning pivotal connection 65 inwardly of and below the plane of the opening defined by inwardly extending flange 33. The location of pivotal connection 65 may be spaced further below the plane of daylight opening 23 if desired depending upon the configuration of the frame members 30 and 37.

Figure 6:
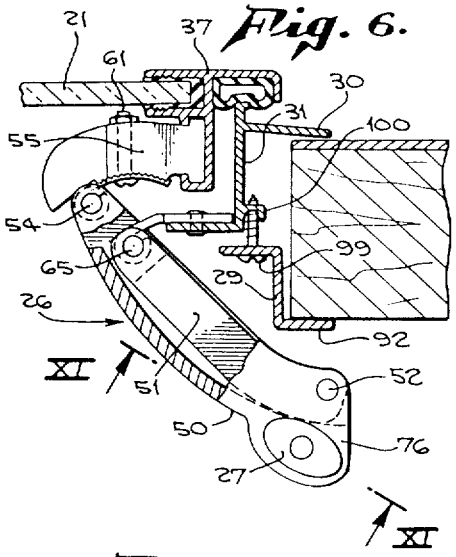
FIG. 6 is a fragmentary sectional view taken in the plane indicated by line VI—VI of FIG. 5, a portion of the latch members being broken away for clarity.
Figure 6:
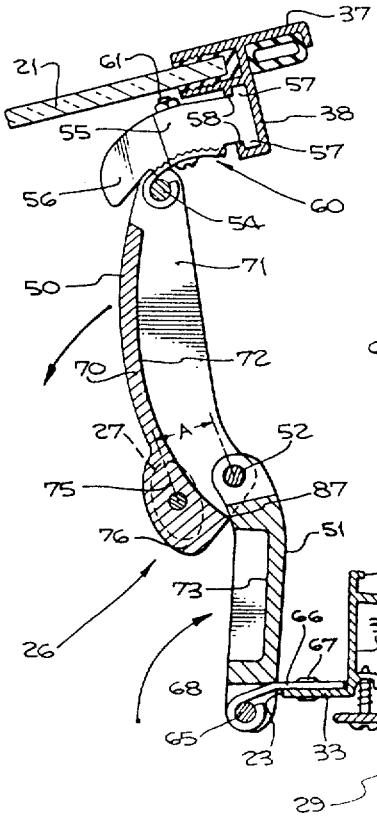

Upper latch member 50 includes a curved wall 70 and parallel side walls 71 which define a recess 72 within which may be received lower latch member 51 when the latch members are in collapsed or closed relation as shown in FIG. 6. Lower latch member 51 includes a longitudinally extending recess 73 for reducing weight of the latch member.

Figure 11:
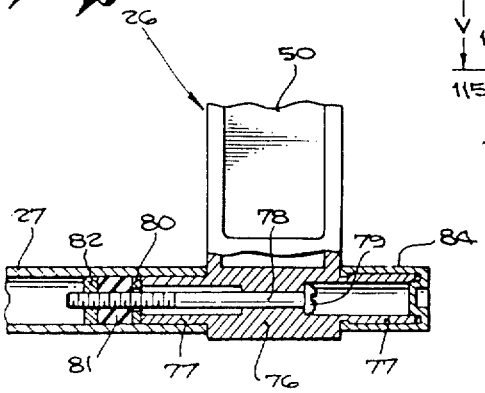
FIG. 11 is an enlarged fragmentary sectional view showing the connection of an operator crossbar to the upper latch member.

Crossbar 27 comprises a tube of lightweight metal formed in a generaly elliptical cross section with the major axis of the elliptical cross section lying generally parallel to the line between the axes of pivotal connections 54 and 52. As best seen in FIG. 8 the axis 75 of crossbar 27 is offset a distance A from the axis of pivotal connection 52, the offset being inwardly directed with respect to opening 23. As best shown in FIG. 8 and FIG. 11 the lower end portion of upper latch member 50 is provided with an enlarged metal portion 76. The portion 76 is provided with oppositely directed hollow cylindrical bosses 77, the inner boss 77 receiving thereover one end of crossbar 27. Crossbar 27 is secured by means of a screwbolt 78 which extends through the outer hollow boss 77 and has a head 79 seated on an internal shoulder in the enlarged portion 76. The end of screwbolt 78 extends through a bearing washer 80 against which is seated a compressible resilient washer 81, the opposite face of washer 81 being engaged by a nut 82 threaded on the end of bolt 78. Washer 81 is compressed by turning the bolt 78 so that the outer circumferential wall of the washer 81 is resiliently frictionally urged into engagement with the hollow tube forming the crossbar 27 and thereby frictionally securing the crossbar 27 to the latch means 26.

The outer boss 77 may be covered with suitable cap 84 having the same cross sectional configuration as crossbar 27, cap 84 being suitably frictionally secured on boss 77.

Figure 7:
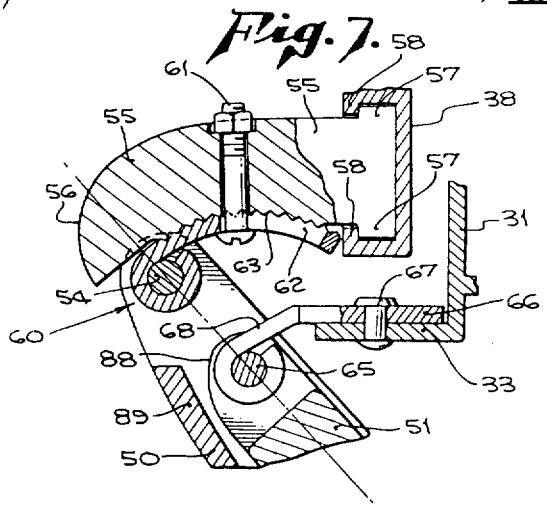
FIG. 7 is a fragmentary enlarged sectional view taken in the plane indicated by line VII—VII of FIG. 5.

In operation of the latch means 20 and assuming that the closure member 21 is in closed position as shown in FIGS. 1, 2, and 6, the crossbar 27 may be grasped by the fingers of one hand and pulled inwardly of opening 23 to rotate lower latch member 51 about its anchor pivotal connection 65. It will be noted that in fully closed position as shown in FIG. 6 that the location of pivotal connection 65 is slightly beyond a line drawn between pivotal connection 52 and pivotal connection 54 to provide an off center toggle action which securely holds the closure member in closed position. As the crossbar is pulled about the anchor pivotal connection 65 the latch members 51 and 50 are separated from their nested relation, the closure member 21 is raised, and when the closure member 21 reaches its uppermost position, it will remain in such position by the frictional action of pivotal connections 52 and 65. Restriction on further movement of pivotal connection 52 beyond its selected offset position is provided by abutment at 87 of enlarged lower latch portion 76 with lower latch member 51. In closed nested relation as shown in FIG. 7 latch member 51 abuts against the inner surface of wall 70 of the upper latch member 50 to limit collapsed relation of the latch members.

When closure member 21 is to be closed, the crossbar 27 may be grasped and pulled inwardly and downwardly to swing the latch members about their pivotal connections 65 and 54 and 52 until the latch members are in closed and nested relation as shown in FIG. 6 and the closure member 21 closed and latched by the toggle relation of the pivotal connections.

It is important to note the relationship of the crossbar 27 when the closure member 21 is in closed position in respect to the plane of opening 23. In FIG. 6 crossbar 27 is located below the plane of opening 23 and outwardly of said opening, the specific location in FIG. 6 being below the edge portion of the wall 24. In this position, crossbar 27 is relatively close to the bottom surface of wall 24. The offset space A between pivotal connections 52 and the axis 75 of the crossbar spaces the crossbar below the bottom surface of wall 24 so that the fingers of the hand of an operator may readily reach between the crossbar and the bottom wall surface 92. In such position as shown in FIG. 2, crossbar 27 is substantially out of the way because of its closeness to the wall 24. Further, such closeness to the bottom surface 92 of wall 24 significantly reduces visual obstruction by the latch means of this invention.

Figure 9:
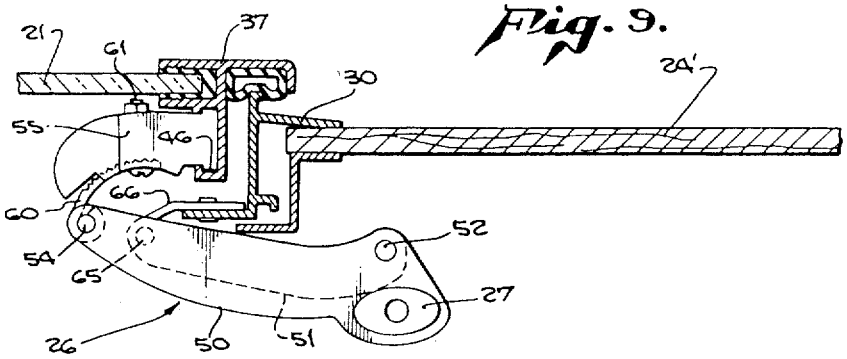
FIG. 9 is a fragmentary sectional view showing the closure member in closed latched position and showing the operator means extending beneath and outwardly of the frame defining the opening for the closure means.
Figure 10:
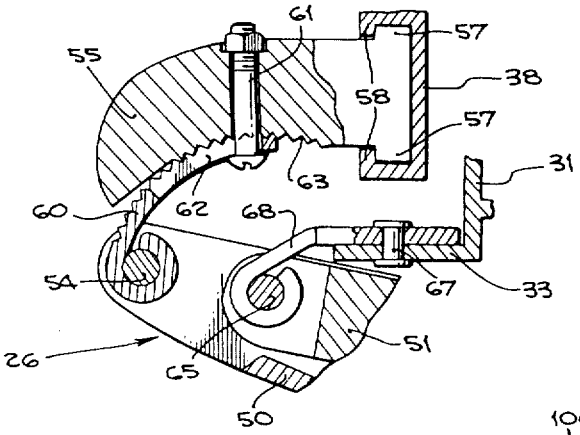
FIG. 10 is an enlarged fragmentary sectional view showing adjustment means of the pivotal connection of the upper latch member to the closure member.

In FIGS. 9 and 10, there is shown a roof structure 24' of substantially less thickness than roof structure 24. The latch means of this invention provides for ready adjustment of pivotal connection 54 in a downward direction by the adjustment means comprising anchor body 55 and anchor element 60. When the pivotal connection is lowered, as shown in FIGS. 9 and 10, the nested collapsed latch members 50 and 51 may be swung into almost parallel relationship with the wall 24'. Even in such relationship it will be apparent that the offsetting of the axis of handle 27 from pivotal connection 52 provides space for the convenient grasping of the crossbar by fingers of the hand of an operator when it is desired to open the closure member 21 or to move it into open latch position as shown in FIG. 9. It will be understood that such adjustment may be readily made by the operator by loosening the bolt and nut assembly 61 and then tightening the assembly so that the anchor pivotal connection 54 is fixed, such adjustment being in accordance with the operator's desire and convenience.

It will also be understood that the frame member 30 in the framed opening 28 may be made of relatively light weight aluminum extrusion material and while designed to be rigid, the closing pressures exerted on the lip 46 and the cross flange 39 may cause distortion or twisting or torquing of that portion of frame member 37 lying adjacent the latch means 26. Means to resist twisting of frame member 37 at this portion of the frame member may comprise a rigid block 95 of generally thickened enlarged J section. Block 95 is seated upon flange 33 and has a length which extends between the latch means 26. The upstanding portion 96 of the J shape extends along one surface of web 31 and in closed position of the closure member 21 is positioned between web 31 and web 38 of the closure frame member 37. The lower lip 46 is received within the recess 97 formed by the J shape. Thus, in the portion adjacent latches 26 twisting or torquing of frame member 30 is positively restricted.

To position Z section 29, which serves as a metal trim member for the opening 28, metal screws 99 may be provided between a lip of the Z section 29 and a relatively small flanged rib 100 extending from web 31.

Figure 4:
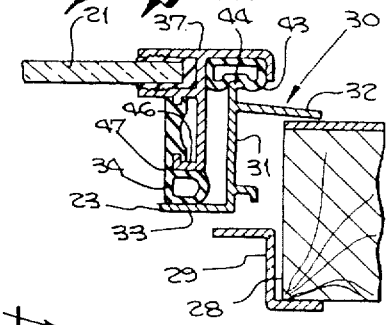
FIG. 4 is an enlarged fragmentary sectional view taken in a vertical plane indicated by line IV—IV of FIG. 1.

In FIG. 4, it will be noted that when closure member 21 is in closed position, the lower lip 46 of closure frame member 37 is pressed against sealing material 34 and the outer seal element 43 is pressed against the top of web 33 as at 44. In an installation where closure member 21 and the vent opening 23 is arranged in a vertical wall, water will drain to the bottom edge of the opening and under some circumstances, may collect sufficiently to present leakage problems. To prevent accumulation of water between lip 42 and web 35 at the bottom portion of such a vertically disposed vent opening, seal 43 and lip 42, may be provided with weep holes.

It will be noted that the resilient material 34 also resists weather entry, provides insulation from metal-to-metal contact between the frame member 37 and frame 30 in closed position, and reduces or dampens vibrations which might cause rattling. The provision of gasket seal 34 on frame 30 around its periphery also improves the appearance of the closure means when it is in closed position. Seal 34 may be of suitable shape.

It may be desirable at selected spaced intervals around the periphery of the roof frame member 30 to provide spacer blocks similar to 95 in order to maintain uniform and accurate spacing between the closure means and the frame opening.

Figure 12:
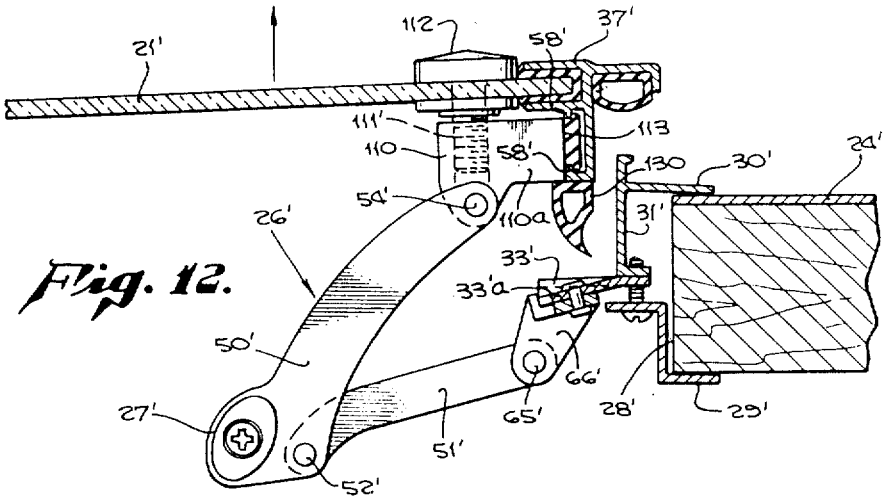
FIG. 12 is a fragmentary sectional view of a modification of the means for moving a closure member into opened, closed and latched position and embodying this invention, the view being in section and illustrating the closure member in partially open position.
Figure 14:
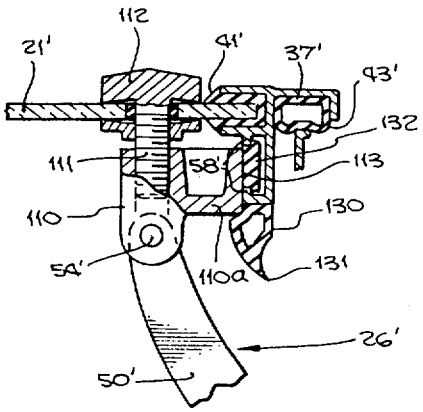
FIG. 14 is a fragmentary view showing means for connecting the operator means to the closure member.
Figure 13:
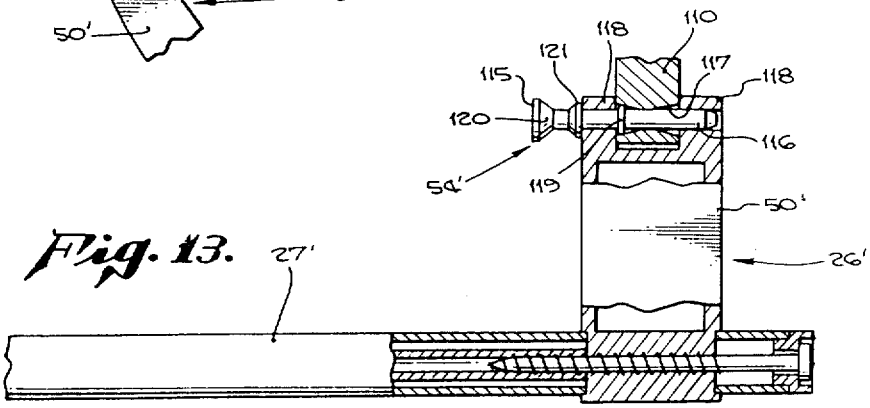
FIG. 13 is a fragmentary sectional view showing a removable pin at one of the pivotal connections of the operator means.

In FIGS. 12, 13 and 14, a modification of the operator means of this invention is shown as applied to a relatively thin section closure member 21' which is provided with frame means 37' around its periphery. In this embodiment the roof or wall 24' includes a peripheral frame member 30' having a cross-sectional shape similar to the frame member of the prior embodiment. A Z section trim member 29' is provided at the bottom edge of the framed opening 28'.

In the description of the embodiment of the invention shown in FIGS. 12–14 inclusive, differences from prior embodiment will be described and emphasized. Latch means 26' has a lower latch member 51' pivotally connected at 65' to an anchor element 66' carried by the inwardly extending flange 33' of the peripheral frame member 30'. In this example, the anchor element 66' is secured to a downwardly pre-bent portion 33'a to provide pre-stressing of flange 33' so that when closure forces act thereupon distortion of the flange 33' and the peripheral frame member 30' is reduced.

Latch member 51' is connected at 52' to the adjacent end of latch member 50' which has a pivotal connection 54' to a connector block 110. Connector block 110 has a threaded connection at 111 to a stud bolt 112 carried by the peripheral margin of closure member 21'. Connector block 110 has an extension portion 110a having a flat face 113 adapted to seat against one or both of ribs 58' of closure frame member 30'.

It will be apparent that the position of pivotal connection 54' may be adjusted vertically by the threaded connection of bolt 112 with connector block 110. To facilitate such adjustment, pivotal connection 54' is provided with a removable pivot pin 115 having a shank 116 receivable within a double or oppositely tapered hole 117 provided in block 110. Latch element 50' has spaced pin mounting lugs 118 to receive pin 115 and a portion of block 110 therebetween. A releasable lock ring 119 is carried by the shank of 116 of the pin for engagement with edges of one of the lugs 118 to retain pin 115 in position. Pin 115 is provided with a frustro conical head 120 of enlarged diameter to facilitate grasping by fingers of a hand so that the pin may be pulled axially and removed from assembly with latch member 50' and block 110. Pin 115 has an enlarged diameter shoulder 121 adapted to seat against adjacent surfaces of latch member 50' to limit insertion of pin 115.

Removal of pin 115 permits the latch member 50' to be released from its pivotal connection 54' and displaced away from the normal axis of the pivotal connection. Under this pin removal condition, it will be apparent that connector block 110 may be readily rotated to raise or lower the same and thereby change the vertical location of pivotal connection 54'. When the desired vertical location is achieved, the connector block and latch member 50' may be realigned and the pin 115 inserted through lugs 118 and through the bore 117 of block 110. In this manner the pivotal connection 54' may be vertically adjusted to permit the latch means 26' to assume a different position with respect to the roof 24' when in closed position.

It will be apparent that when the pivotal connection 54' is lowered in this manner that the face 113 of block 110 may cease to bear against the upper rib 58' but will always bear against the lower rib 58' of the peripheral frame member 30'. Such changing of the position of pivotal connection 54' also permits adjustment of the exerted closure force of the latch means 26' when the closure 21' is lowered and the latch means 26' moves into latched position.

The closure member structure shown in FIG. 12 is particularly adapted to a vent panel wherein relatively thin flat tempered glass is used and is subjected to some bending by bending of peripheral frame 30' in order to match the slightly curved contour of a vehicle van roof. The connector block 110, which is rigid and which is carried by the bolt 112, provides pressure engagement against the ribs 58' during certain portions of the opening and closing operation so that the peripheral frame 37' will not be subject to distortion due to stresses transmitted through the pivotal connections.

The latch means 26' is provided with crossbar 27' as in the prior embodiment so that spaced latch means 26' may be simultaneously operated with a simplified single motion of the offset crossbar. The latch members 50' and 51' [is] *in* closed, collapsed position are in nested relation as in the prior embodiment. Lower latch member 51' is symmetrical with respect to its axis. The wall surfaces of latch member 50' limit travel of the latch means.

In the example the closure peripheral frame member 37' is provided with a seal element 130 of different configuration than the prior embodiment seal element 130 having a curved configuration terminating in a feather portion 131 to facilitate entry of the seal memi[illegible] the opening defined by the frame member 30'. Seal element 130 may be secured in suitable manner by a wall 132 having interlocking engagement with the ribs 58'.

Figure 15:
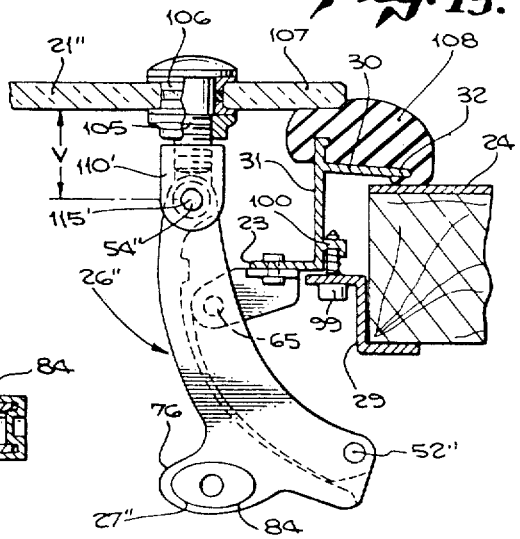
FIG. 15 is a fragmentary section view of the means of this invention adapted to a closure member comprising an unframed glass panel.

In FIG. 15, another modification of this invention is shown applied to an unframed closure member 21''. It may be desirable to use a pane of plexiglass or other translucent material without the use of a metal frame such as closure frame 37, 37'. In such an installation, the latch means 26'' is constructed similar to that described above except that the pivotal connection of the upper latch member at 54'' is made to the lower end of a stud bolt 105 secured by suitable gasketed washer 106 to the member 21'. To provide sealing between the peripheral edge margins 107 of the member 21' and the framed member 30, a strip 108 of relatively thick resilient compressible gasket material may be bonded to the upper portion of frame member 30 including mechanical grasping by strip 108 of the outer edge of flange 32 and of the top portion of web 31.

In this example, anchor [piovotal] *pivotal* connection 54'' lies above the plane of opening 23 and may include connector block 110' and a releasable pivot pin 115'. Connector block 110' has a threaded bore engaged by stud bolt 105. Anchor pivotal connection 65'' is preferably made by a downwardly extending anchor member as in the prior modification. The penetration of stud bolt 105 in the threaded bore may be decreased to lower pivot connection 54'' so that latch means 26'' may be moved into close proximity below and outwardly of the edge of the framed opening in wall 24.

In the examples of the invention described above, it is important to note that one of the pivotal connections of the latch means is vertically adjustable in order to vary the position of the latch means in its fully closed position with respect to the roof or wall. Even when the pivotal connection 52 of the latch means is in close proximity to the interior surface of the roof, the offset axis of the crossbar 27 provides sufficient room for insertion of a finger to assure proper grasping of the crossbar for operation of the latch means to raise the closure member and to draw the closure member into snug closed relation with respect to the framed opening. The adjustment of the pivotal connections 54, 54' and 54'' also provides for adjustment of the closing force which will be exerted on the peripheral seals of the closure member so that an optimum closing force may be selected and used. A weather tight seal is thereby provided with an optimum minimum force being applied to the seals to effect such a weather tight seal.

The adjustment of the pivotal connection also permits the latch means to be adjusted in closed position relative to the interior surface of the wall or roof so that a preferred position of the latch means and crossbar may be obtained.

It will be understood that various modifications and changes may be made in the construction and operation of the means for opening, closing and latching a closure member for a vent opening all of which may come within the spirit of this invention and such changes and modifications coming within the scope of the appended claims are embraced thereby.

I claim:

1. In a means for opening, closing, and latching a closure member hinged at one side of an opening defined by a frame provided in a wall, the combination of:

an upper latch member having one end provided with a pivotal connection to said closure member;

a lower latch member having one end provided with a pivotal connection to said frame; the other ends of said latch members being pivotally interconnected together; the pivotal connection of the lower latch member to said frame having a pivotal axis adjacent the plane of the frame opening;

and actuating means connected to said upper latch member and said pivotal connection of said latch members to said closure and to said frame being at the side of said opening opposite to said hinged connection of said closure member to said frame;

the pivotal interconnections of the other ends of said latch members lying beneath the framed opening when the closure member is closed and the latch members are collapsed and in nested relation;

said pivotal connections providing pivotal axis having a toggle relationship in closed position of said closure member;

and means to adjust clearance of said nested latch members with respect to the interior surface of said wall, said adjustment means including a bolt carried by said closure members;

and a connecting block threaded on said bolt and providing a pivotal connection for said upper latch member.

2. In a means as stated in claim 1 including a removable pin at said pivotal connection for said upper latch member.

3. In a means for opening, closing, and latching a closure member hinged at one side of an opening defined by a frame provided in a wall, the combination of:

an upper latch member having one end provided with a pivotal connection to said closure member;

a lower latch member having one end provided with a pivotal connection to said frame; the other ends of said latch members being pivotally interconnected together; the pivotal connection of the lower latch member to said frame having a pivotal axis adjacent the plane of the frame opening;

and actuating means connected to said upper latch member the said pivotal connection of said latch members to said closure and to said frame being at the side of said opening opposite to said hinged connection of said closure member to said frame;

the pivotal interconnections of the other ends of said latch members lying beneath the framed opening when the closure member is closed and the latch members are collapsed and in nested relation;

said pivotal connections providing pivotal axes having a toggle relationship in closed position of said closure member;

and means to adjust clearance of said nested latch members with respect to the interior surface of said wall, said adjustment means including means carried by said closure member for displacing and securing said pivotal connection of said upper latch member with said closure member;

said displacing and securing means including an anchor element having a serrated inwardly and downwardly curved edge carried by said closure members;

a mating connector element providing a pivot connection to said upper latch member and engageable with said serrated edge;

and means for securing said anchor and mating elements in selected position of said upper latch member pivotal connection.

4. In a means for opening, closing, and latching a closure member hinged at one side of an opening defined by a frame provided in a wall, the combination of:

spaced sets of upper and lower latch members, each set of latch members including an upper latch member having one end provided with an adjustable pivotal connection to said closure member;

a lower latch member having one end provided with a pivotal connection to said frame adjacent the plane of the frame opening;

the other ends of said latch members being pivotally interconnected together;

each of said upper latch members having a latch portion offset in a direction downwardly from the plane of said opening in latched closed position from the pivotal connection of said other ends of said latch members; the said pivotal connections of said latch members to said closure and to said frame being at the side of said opening opposite to said hinged connection of said closure member to said frame;

the pivotal connections of the other ends of said latch members lying beneath and outwardly of the edge of the framed opening when the closure member is closed and the latch members are collapsed and in nested relation;

[said] *and* actuating means including a crossbar extending between and connected to the offset portions of said upper latch members of said sets of latch members for simultaneous actuation of said latch members to raise said closure member to open position and to close said closure member to close position;

said offset portions of said upper latch members of each set and said crossbar connected thereto being in spaced relation to said wall to facilitate grasping of said crossbar.

5. In a means as claimed in claim 4 wherein said frame includes an inwardly extending flange disposed below edge margins of said closure member;

and means positioned on said flange of said frame between said sets of latch members to maintain alignment of said frame as said closure member is drawn into closed position by said sets of latch members.

6. In a means as claimed in claim 5 wherein said alignment means includes a block of rigid material for restricting distortion of said frame as said sets of latch members are simultaneously moved into latch toggle locked position.

7. In a means as claimed in claim 4 wherein said adjustable pivotal connection of said upper latch member to said closure member includes a bolt carried by said closure member;

and a connecting member threaded on said bolt and having a pivotal connection for the upper end of said upper latch member;

and a removable pin at said pivotal connection for said upper end of said upper latch member to said connecting member;

whereby each set of latch members are individually adjustable for providing uniform closure pressure of said closure member at the side of said opening opposite to said hinged connection of said closure member to said frame.

*8. In a means for opening, closing, and latching a closure member hinged at one side of an opening defined by a frame provided in a wall, the combination of:*

*spaced sets of upper and lower latch members, each set of latch members including*

*an upper latch member having one end provided with a pivotal connection to said closure member;*

*a lower latch member having one end provided with a pivotal connection to said frame adjacent the plane of the frame opening;*

*the other ends of said latch members being pivotally interconnected together;*

*each of said upper latch members having a latch portion offset in a direction downwardly from the plane of said opening in latched closed position from the pivotal connection of said other ends of said latch members; the said pivotal connections of said latch members to said closure and to said frame being at the side of said opening opposite to said hinged connection of said closure member to said frame;*

*the pivotal connections of the other ends of said latch members lying beneath and outwardly of the edge of the frame opening when the closure member is closed and the latch members are collapsed and in nested relation;*

*and actuating means including a crossbar extending between and connected to the offset portions of said upper latch members of said sets of latch members for simultaneous actuation of said latch members to raise said closure member to open position and to close said closure member to closed position;*

*said offset portions of said upper latch members of each set and said crossbar connected thereto being in spaced relation to said wall to facilitate grasping of said crossbar.*

*9. In a means for opening, closing and latching a closure member hinged at one side of an opening defined by a frame provided in a wall lying generally in a plane, the closure member being latchable at the other side of said opening by at least two sets of spaced latch means, each set of latch means including an upper latch member having one end provided with a pivotal connection to said closure member and a lower latch member having one end provided with a pivotal connection to said frame adjacent the plane of the frame opening and wall, the other ends of said latch members being pivotally interconnected together, the provision of:*

*means for actuating both sets of latch means simultaneously including*

*a laterally extending portion on each upper latch member adjacent the pivotal connection of the other ends of the latch members, the lateral portion extending away from the plane of said wall in closed position of the latch meams;*

*a crossbar extending between said laterally extending portions;*

*and means interconnecting the laterally extending portions of the upper latch members to the adjacent end portions of the crossbar for positioning the crossbar in spaced relation to the pivotal connections of the other ends of said latch members and in spaced relation to said wall to facilitate grasping of the crossbar in closed position of the closure member.*

*10. In a means as stated in claim 9 wherein*

*said crossbar has an elongated cross section in which the major axis of the elongated cross section lies generally parallel to the line between the axes of the pivotal connections of the upper latch member with the closure member and with the other end of the lower latch member.*

*11. In a means as stated in claim 9 wherein*

*said crossbar is provided with an elongated eliptical cross section having major and minor axes,*

*the major axis of said crossbar lying parallel to and spaced from the plane of said wall when the latch means are in collapsed, closed position.*

*12. In a means as stated in claim 9 wherein said crossbar includes end portions extending beyond the latch means.*

* * * * *